US011475014B2

(12) United States Patent
Kříž

(10) Patent No.: US 11,475,014 B2
(45) Date of Patent: Oct. 18, 2022

(54) UPDATING A TOPLIST FOR A CONTINUOUS DATA STREAM

(71) Applicant: Avast Software s.r.o., Prague (CZ)

(72) Inventor: Antonín Kříž, Prachatice (CZ)

(73) Assignee: Avast Software s.r.o., Prague (CZ)

( * ) Notice: Subject to any disclaimer, the term of this patent is extended or adjusted under 35 U.S.C. 154(b) by 209 days.

(21) Appl. No.: 16/721,745

(22) Filed: Dec. 19, 2019

(65) Prior Publication Data

US 2020/0201864 A1 Jun. 25, 2020

Related U.S. Application Data

(60) Provisional application No. 62/782,800, filed on Dec. 20, 2018.

(51) Int. Cl.
*G06F 16/2455* (2019.01)
*G06F 7/08* (2006.01)
*G06F 16/22* (2019.01)
*G06F 16/23* (2019.01)

(52) U.S. Cl.
CPC .......... *G06F 16/24568* (2019.01); *G06F 7/08* (2013.01); *G06F 16/2255* (2019.01); *G06F 16/2379* (2019.01)

(58) Field of Classification Search
USPC ........................................................ 707/753
See application file for complete search history.

(56) References Cited

U.S. PATENT DOCUMENTS

| | | | | |
|---|---|---|---|---|
| 6,678,692 B1* | 1/2004 | Hyatt | ................... | G06F 16/355 707/758 |
| 7,769,740 B2* | 8/2010 | Martinez | ............... | G06F 16/951 707/706 |
| 10,114,884 B1* | 10/2018 | Valensi | ................. | G06F 3/0482 |
| 2006/0195440 A1* | 8/2006 | Burges | ............... | G06F 16/9535 |
| 2007/0214131 A1* | 9/2007 | Cucerzan | ............. | G06F 16/951 |
| 2010/0262612 A1* | 10/2010 | El-Saban | .............. | G06F 16/338 707/752 |
| 2012/0197750 A1* | 8/2012 | Batra | .................. | G06Q 30/0631 705/26.7 |
| 2012/0278316 A1* | 11/2012 | Reznik | ............. | G06F 16/24578 707/723 |
| 2017/0228322 A1* | 8/2017 | Chang | ................. | G06F 12/0859 |
| 2019/0294691 A1* | 9/2019 | Bortnikov | ........... | G06F 16/3346 |
| 2020/0372472 A1* | 11/2020 | Kenthapadi | ............ | G06N 20/20 |

* cited by examiner

*Primary Examiner* — Cam Linh T Nguyen
(74) *Attorney, Agent, or Firm* — Avek IP, LLC; William B. Kircher

(57) ABSTRACT

Systems and methods maintain a toplist associated with a sliding window having m elements. The toplist can include the top k elements of the sliding window, where k is less than m (typically an order of magnitude or more less than m). As new elements are received from a data stream, a counter associated with the new element is updated and the new element is inserted into the sliding window. If the toplist has less than k elements, the new element is added. Otherwise, if the new element is already in the toplist, its counter value is updated with the new value. Otherwise, if the new element's counter is smaller than the smallest element in toplist, then do nothing. If the new element counter is larger than the smallest counter in the toplist, the smallest element is discarded from the toplist and the new element is inserted.

20 Claims, 5 Drawing Sheets

```
#create empty toplist
toplist = None
min_element = None this routine gets element with the smallest counter,  it's not very fast, so it's not
called very often
def update_minimal_element( ) :
        for element in toplist :
                if element.counter < min_element.counter :
                        min_element = element this is the main routine, it's called for every new element
def update( new_element ) :
        #if element is in toplist, just update its counter
        if new_element in toplist :
                toplist[ new_element.name ].counter = new_element.counter
                #reset minimal element if it was just updated
                if min_element.name is new_element.name :
                        min_element = None
                return if toplist doesn't have K elements, add element to toplist
        if toplist.size( ) < K :
                toplist[ new_element.name ].counter = new_element.counter
                return now toplist has K elements
        #update minimal element if needed
        if min_element is None :
                update_minimal_element( )

#if new element is bigger than min_element insert it into toplist and remove
        #min_element
        if min_element.counter < new_element.counter :
                #remove minimal element
                toplist.remove( min_element.name )
                #insert new element
                toplist[ new_element.name ] = new_element.counter
                #reset minimal element
                min_element = None this routine just sorts the top list
def get_toplist( ) :
        return toplist.sort( by .counter )
```

UPDATING A TOPLIST FOR A CONTINUOUS DATA STREAM

RELATED APPLICATION

This Application claims the priority benefit of U.S. Provisional Patent Application Ser. No. 62/782,800, filed on Dec. 20, 2018, entitled "UPDATING A TOPLIST FOR A CONTINUOUS DATA STREAM," the entire disclosure of which is incorporated herein by reference.

FIELD

The disclosure relates generally to data management on computing systems, and more particularly, to updating a toplist for a continuous data stream.

BACKGROUND

It is often useful to be able to maintain a "top K" list of data elements in a set of M data elements, where K is less than M. As a simple example, assume that a survey is performed to determine the top 10 most popular colors. In some conventional methods, a system can create a histogram with pairs <color, counter>. The histogram can be sorted by counter and first 10 items would be the answer for the question. Alternatively, the set of M elements (pairs of <color, counter>) may already be known and it may be desirable to quickly get the top K elements. A system can sort the list, but this can consume large amounts of computing resources and be very time consuming for large sets. Further, it can only be performed for finite sets (sets with fixed known size).

For continuous data streams (i.e., streams of data that are continuously generated and that have no predetermined end) a system can maintain a sorted array of K elements (referred to as a toplist). As new elements are added, the system determines if the newly added entry is already in the toplist, and if so, update its counter and re-sort the toplist. If the item is not in toplist, the new element is added to the toplist and the toplist is sorted. The last element of the toplist is removed if the size of toplist is larger than K elements.

While the above-described conventional method can work if the distribution of the data in the data stream is generally random and the size of K is large, it is typically very computationally expensive and slow because the toplist is typically sorted often. For example, the toplist is sorted with every new element. Sorting is typically a very slow operation, especially if large sets of data are being sorted. Further, it is typically not practical to continuously sort elements if a data stream has very high throughput, because the sorting can result in an unacceptable slowdown in processing the data stream.

BRIEF DESCRIPTION OF THE DRAWINGS

For a better understanding of the inventive subject matter, reference may be made to the accompanying drawings in which:

FIG. 3 illustrates example pseudo-code for a method for continuously updating the top K elements from a data stream.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as describing examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
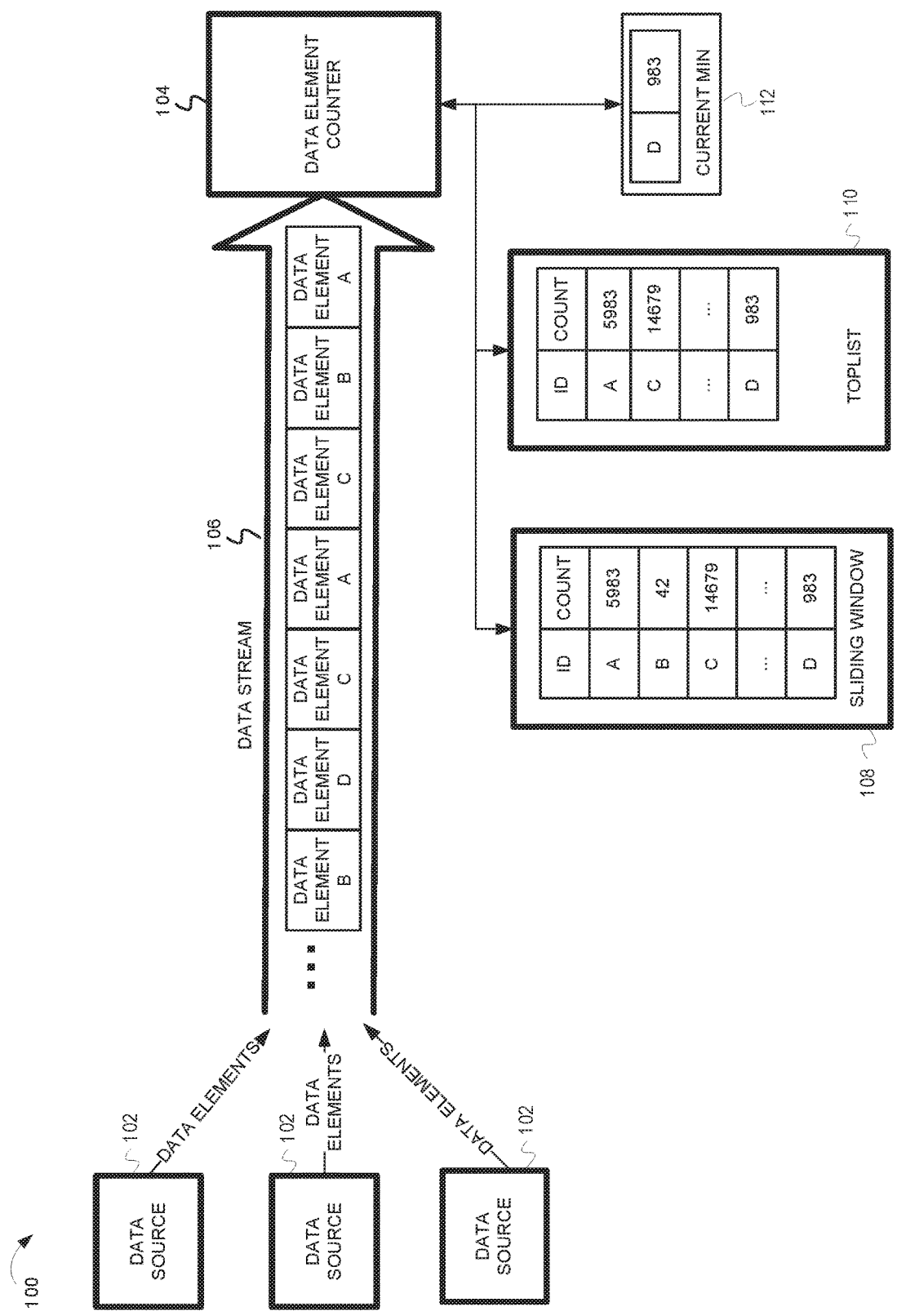
FIG. 1 is a block diagram illustrating components of a system for continuously updating the top K elements from a data stream.

FIG. 1 is a block diagram illustrating components of a system 100 for continuously updating the top K elements from a data stream. In some aspects, system 100 can include data sources 102 that provide a data stream 106 to a data element counter 104. Data source 102 can be an application, system program, operating system component or any other unit of executable code that can generate data elements for transmission to data element counter 104. A data source 102 can execute on various types of computing devices. For example, a data source 102 can execute on a personal computer, laptop computer, tablet computer, server computer, mainframe computer, smart phone, set top box, Internet of Things (IoT) device, gaming console, etc. The embodiments are not limited to any type of computing device.

The data elements provided by a data source can represent various items. For example, a data element can be a currently visited domain, an identifier of an executed file, an identifier of an installed app on a smart phone, an identifier of an active virus etc. The embodiments are not limited to any particular type of data element. In some aspects, the data elements can represent a single instance of the item represented by the data element. In alternative aspects, the data element can include a count representing a number of instances of the item represented by the data element. For example, the data element can include a count of the number of times a domain was visited by an application.

Data element counter 104 receives the data elements transmitted from one or more data sources 102 as part of a data stream 106. Data element counter 104 can be a standalone application or service, it can be a component of an application, system program, operating system component, or any other unit of executable code. In some aspects, data element counter 104 maintains a sliding window 108, a toplist 110, and a current minimum 112.

Sliding window 108 is a data structure that maintains a count of the data elements in a data stream 106. For example, sliding window 108 can maintain a count of the number of times a data element "A" arrives in the data stream, the number of times a data element "B" arrives in the data stream etc. The number of elements m in sliding window 108 is the number of distinct data elements (e.g., number of distinct data element identifiers). When the sliding window becomes full, an old element is removed and replaced by the new element. Various removal strategies are possible. For example, a least used (lowest counter) can be selected and removed. In some aspects, the least used element from a randomly selected portion of the sliding window can be removed. An offset (0 to m) into the data structure can be randomly determined, and the least used element from offset to offset+size (where size can be many times smaller than m) is selected for removal and replacement with the new element. In some aspects, sliding window 108 is a hashmap, where the data element identifier is a key into the hashmap and the value is a counter of the number of times the data element arrives in the data stream. However, the embodiments are not limited to any particular data structure for implementing the sliding window 108. Any data structure that supports a key/value pair can be used. For example, sliding window 108 can be an associative array.

Toplist 110 is a data structure having k elements. Toplist 110 comprises the k data elements having the highest counter values. In some aspects, m can be an order of magnitude larger than k. In some aspects, the toplist 110 can be a hashmap, where the data element identifier is a key into the hashmap and the value is a counter of the number of times the data element has appeared in the data stream. However, the embodiments are not limited to any particular data structure for implementing the toplist 110. Any data structure that supports a key/value pair can be used. For example, toplist 110 can be an associative array.

While the data element counters in toplist 110 are based on elements that are added to the sliding window 108, toplist 110 can also be independent from sliding window 108 in some aspects. For example, as noted above, when the sliding window 108 becomes full, an old element can be removed from the sliding window 108. An entry for the element to be removed from the sliding window 108 may also exist in toplist 110. However, the element removed from the sliding window 108 can be kept in the toplist 110 to avoid loss of information.

Current minimum 112 identifies the data element having the lowest counter value in the toplist 110. In some aspects, the current minimum 112 includes an identifier of the data element in the toplist having the current minimum counter value.

The data element counter 104 processes the data elements in the data stream 106 to update the sliding window 108, toplist 110, and current minimum 112 as further described below with respect to FIGS. 2 and 3.

FIG. 1 illustrates three data sources 102. Those of skill in the art having the benefit of the disclosure will appreciate that there could be fewer or more data sources than those illustrated in FIG. 1. Further, the data sources 102 may be on the same computing device or different computing devices as one another. Additionally, data element counter 104 can be on the same computing device as a data source 102, or it may be on a different computing device.

Figure 2:
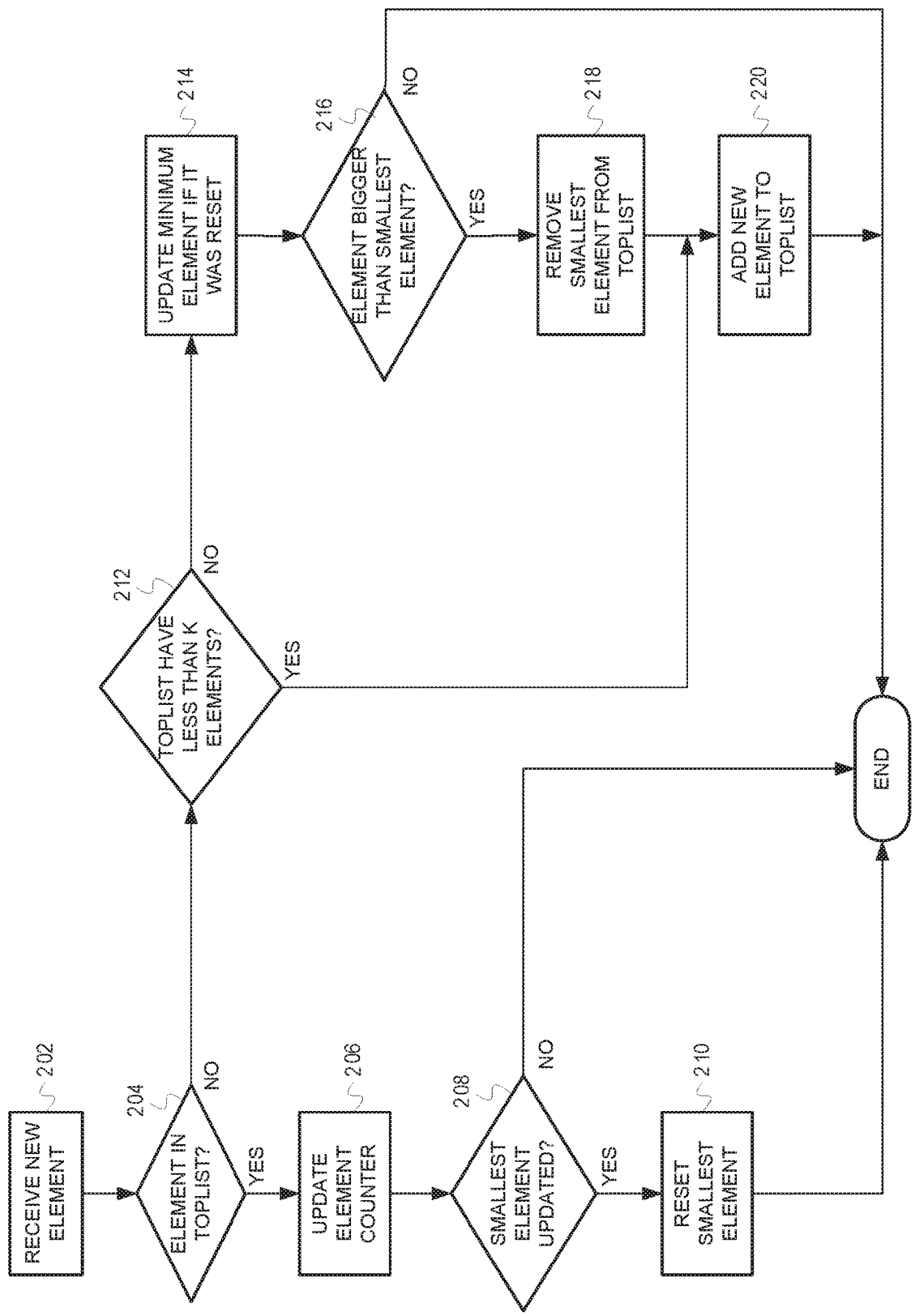
FIG. 2 is a flow chart illustrating a method for continuously updating the top K elements from a data stream.

FIG. 2 is a flow chart illustrating a method for continuously updating the top K elements from a data stream.

At block 202, a new data element is received. The new data element may be the next data element read from a data stream by the data element counter. The new data element includes an element identifier. For example, the identifier may be a currently visited domain, a name of an executed file, a name of an installed app on a smart phone, an identifier of an active viruses etc. The data element may optionally include a count. For example, in the case of a data element that corresponds to domain visits, the count may be the number of times the domain was visited. The data element may include other fields. The data element is inserted into the sliding window. In some aspects, the sliding window is checked to determine if the data element identifier already exists in the sliding window. If not, the data element can be added to the sliding window. If the data element identifier is already in the sliding window, the data element counter in the sliding window can be updated by adding the new data element's count value to the current count value for the data element in the sliding window.

At block 204, a check is made to determine if the data element is already in the toplist. For example, a check can be made to determine if there is an entry in the toplist having the same identifier as the data element identifier. If the data element is already in the toplist, flow proceeds to block 206. If the data element is not in the toplist, the method proceeds to block 212.

At block 206, the data element counter in the toplist is updated. For example, if the data element represents a single instance of the item represented by the data element, the data element counter in the toplist can be incremented. If the data element includes a count field, the count field can be added to the data element counter. In some aspects, the count field of the new data element is added directly to the data element counter (or copied from the updated counter for the corresponding data element in the sliding window). In alternative aspects, a complex counter implements a "forgetting curve" counter in which the count associated with a data element identifier fades over time. In embodiments that implement such a counter, the counter can include two fields, the counter and a time value corresponding to the latest update of the counter. When an update occurs to the data element counter, it can be first adjusted to fade (e.g., adjusted downward) based on the time of the last update. The counter can then be incremented or otherwise adjusted based on the update to the data element in the sliding window.

At block 208, a check is made to determine if the smallest data element in the toplist was updated. For example, the data element counter can compare the identifier of the incoming data element with the identifier of the current minimum data element. If the identifiers match, the smallest data element in the toplist is being updated. If the smallest data element was not updated, then the method ends. Otherwise, the method proceeds to block 210.

At block 210, the current minimum data element is updated if necessary. In some aspects, the toplist can be scanned to determine if the current minimum data element should be reset to a new value. This can happen if, after an update, the count associated with the current minimum data element is no longer the minimum count in the toplist. After updating the current minimum data element, the method ends.

Block 212 is reached if the new element is not currently in the toplist. At block 212, a check is made to determine if the toplist has room for adding the new data element. For example, a check is made to determine if the toplist has less than k elements, where k is the size of the toplist. If there is room in the toplist for the new data element, then the method proceeds to block 220, where the new data element is added to the toplist. The method then ends.

Block 214 is reached if the toplist is full, that is, if the toplist has k elements. At block 214, the current minimum element is set if necessary. The current minimum element may not have been set (i.e., may be nil) if the toplist has just reached k values, or if the current minimum value was removed in a previous iteration of the method (see block 218 below). If the current minimum element is not set, the toplist is scanned for the data element having the lowest counter value. The identifier for that element and its associated counter value are set as the current minimum data element.

At block 216, a check is made to determine if the counter value for the new data element is larger than the current minimum element. If the counter value is less than the current minimum data element, then the new data element is not inserted into the toplist and the method ends.

Block 218 is reached if the new data element is larger than the current minimum data element. At block 218, the current minimum data element is removed from the toplist and the current minimum is reset to nil. For example, the counter can be set to a zero. Additionally, the identifier can be set to a nil value such as a string.

At block 220, the new data element is added to the toplist. That is, the identifier for the new data element and its associated counter value are added to the toplist. The method then ends.

If a sorted toplist is desired, the current toplist can be copied and the copy can then be sorted.

FIG. 3 illustrates example pseudo-code for a method for continuously updating the top K elements from a data stream. The pseudo-code illustrates three functions, an "update_minimal_element" that scans the toplist to determine the current minimum element, an "update" function that adds a new element to the toplist if necessary, and a "get_toplist" function that returns a sorted toplist.

The above-described data structures, method and pseudo-code can provide advantages over current systems. For example, in some aspects, the toplist is changed (e.g., new elements are inserted) relatively rarely. Most of the time, elements in the toplist are only updated with a new counter value which can be a very fast operation. Slower operations such as insertion of a new element or removal of an element occur relatively infrequently. Further, the toplist does not need to be sorted at all times, and is only sorted upon request. The systems and methods described herein provide a practical application. For example, the systems and methods described herein can be implemented in any software application, service, or other executable that utilizes a toplist. As one example, the systems and methods described herein may be incorporated into a malware detection application or a malware threat analysis platform or other analysis applications. An example of a malware threat analysis platform is the ApkLabIO platform provided by Avast Software s.r.o. of Prague, Czech Republic. The malware threat analysis platform may receive continuous streams of data from numerous different sources (e.g., mobile devices), and may maintain counters associated with various aspects and/or features detected within the data or associated with the data (e.g., metadata).

As an example, the malware threat analysis platform can analyze receive a continuous data stream of information regarding malware samples found on mobile devices of participating users. In some aspects, the malware threat analysis platform can maintain a toplist comprising counts of various malware samples indicated or seen in the data stream. The entries in the toplist (or a subset thereof) can be presented to users or used by applications for further analysis. As an example, the toplist can include the top ten malware samples for the continuous data stream.

In other aspects, the malware threat analysis platform can analyze the continuous data stream and maintain a toplist comprising counts of various Android Packages (APKs), Portable Executable (PE) files, or other executable files indicated in the continuous data stream. As an example, the top 100 trending APKs, PEs or other executables can be included in a toplist. In addition, the system can use the appearance of an APK, PE or other executable in a toplist of executed or downloaded files to identify files for fine-tuning or for performing a streamlined analysis. This can increase the performance of a system. For example, the streamlined or fine-tuned analysis can typically be performed faster or with less resource usage, thereby increasing the performance of malware scanning and detection systems.

In further aspects, a malware threat analysis platform can maintain a toplist of the malware that is most detected. This can be utilized to identify false positives. For example, if one or more of the malware threats in the toplist has an unusually high count of detections, they can be flagged as potential false positives.

In still further aspects, the continuous data stream may include domain or host identifiers (e.g., domain names and hostnames). A toplist of counters can be maintained to identify the most visited domains or hosts.

All of the aforementioned toplists can be maintained using the systems and methods described herein.

Figure 4:
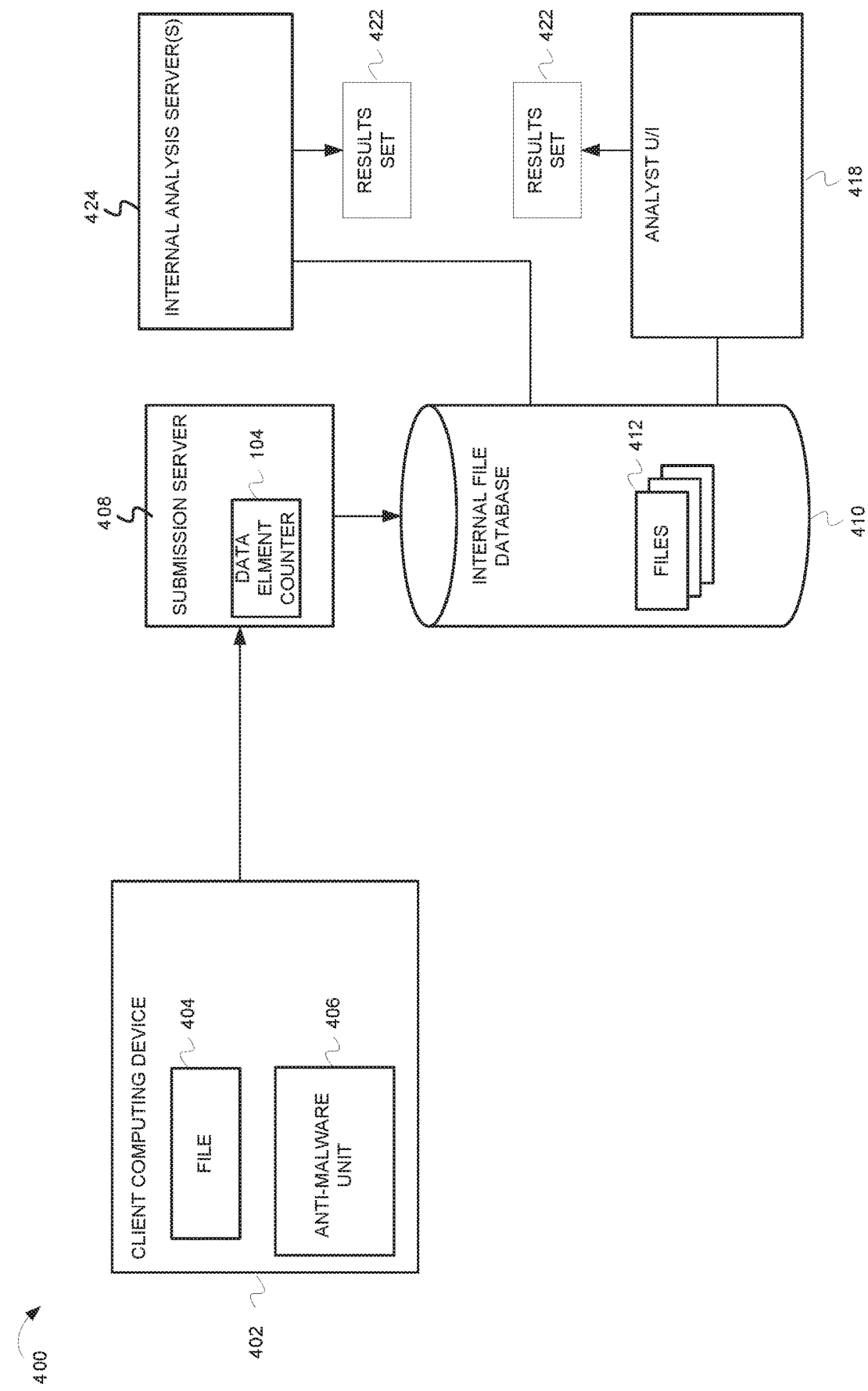
FIG. 4 is a block diagram illustrating an example system for continuously updating the top K elements from a data stream.

FIG. 4 is a block diagram illustrating an example system 400 utilizing a counter to maintain a toplist associated with a sliding window. In some embodiments, system 400 includes client computing device 402, submission server 408, internal file database 410, internal analysis server 424, and an analyst user interface (U/I) 418.

Client computing device 402 can be a desktop computer, laptop computer, server computer, tablet computer, smart phone, personal digital assistant, media player, set top box, game console, IoT (Internet of Things) device or any other device having one or more processors and memory for executing computer programs. The embodiments are not limited to any particular type of computing device. Client computing device 402 can include an anti-malware unit 406. Anti-malware unit 406 can include one or more of software, firmware or other programmable logic that can detect malicious files. Additionally, anti-malware unit 406 can submit a new file for analysis. The new file may be a file that has not been seen before by the anti-malware unit 406, or may have only been seen on a low number of systems (e.g., the file may be a day one malware source). In response to determining that the file contains malware, the anti-malware unit can alert the user, quarantine the new file, and/or remove the malware from the file.

In response to determining that the file is suspected of containing malware, client computing device 402 can submit file to submission server 408. Submission server 408 can perform preprocessing on the new file 404 and add the new file to a collection of files 412. As part of the analysis, a data element counter 104 as described above may be used to generate statistics regarding the new file.

Analyst U/I 418 can provide a user interface for an analyst to access tools that can be used to determine if a file contains malware. The analyst U/I 418 may include a normalizer 102 that can be used to generate an output buffer as described above that can be associated with a file under analysis. The generated output buffer can be compared to output buffers associated with files known to contain malware, or known clean files to aid in determining if a file contains malware. Further, in some aspects, the analyst U/I can receive an unknown file (i.e., a PE file that has not been analyzed yet). The analyst U/I can compare the data generated from the unknown file with data associated with files 412 in the internal file database 410 to determine if malware is present in the newly submitted file.

Internal analysis servers 424 can perform static or dynamic analysis of a file for internal database 410. In some aspects, an internal analysis application can perform a static analysis of a file. The data associated with the newly submitted file can be compared to data associated with known malware, or known clean files to aid in determining if a file contains malware. Further, the data generated for the file can be stored along with the file in internal file database 410.

Figure 5:
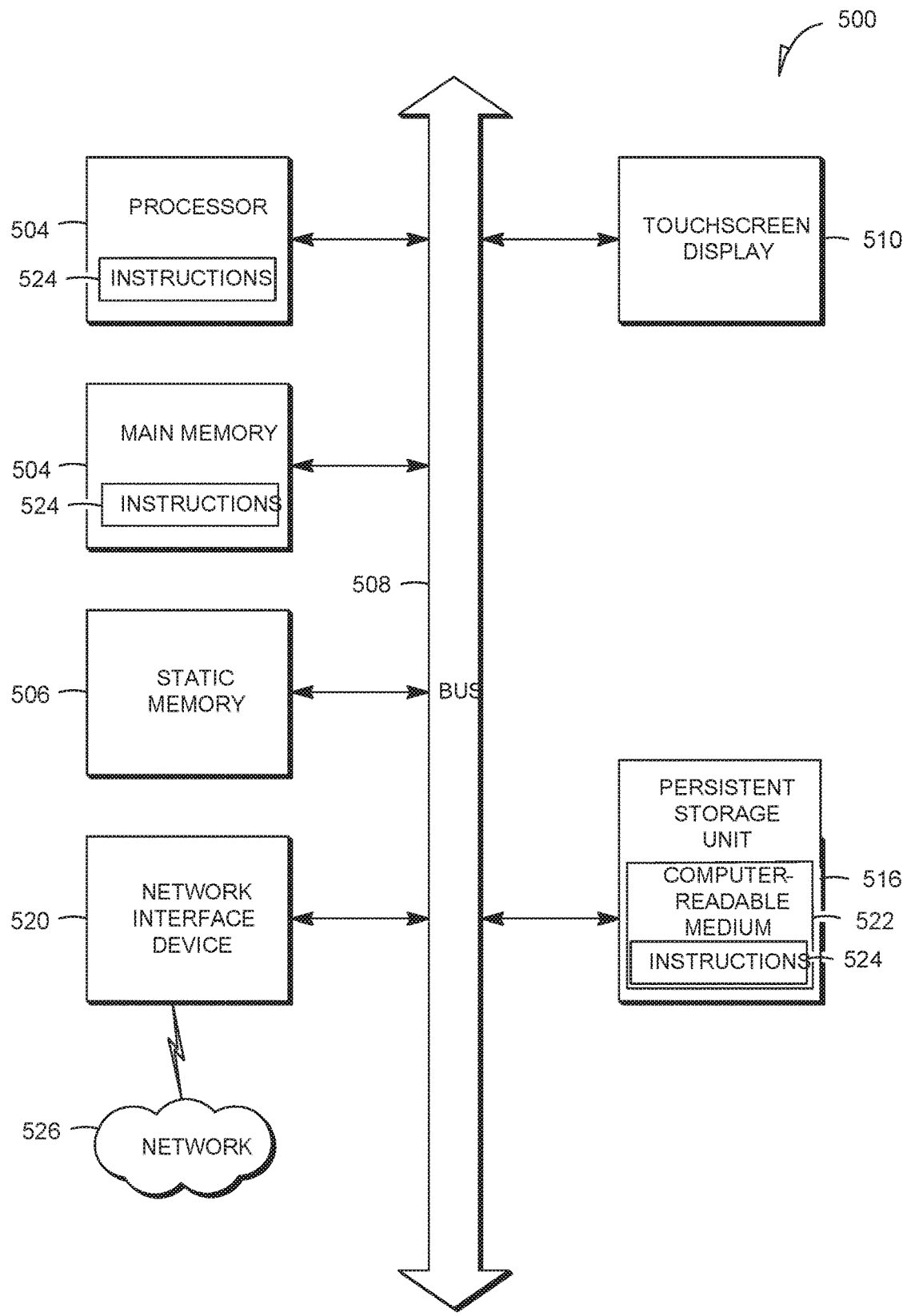
FIG. 5 is a block diagram of an example embodiment of a computer system upon which embodiments of the inventive subject matter can execute.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a touchscreen display unit 510. In example embodiments, the computer system 500 also includes a network interface device 520.

The persistent storage unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A system comprising:
one or more processors;
at least one non-transitory machine-readable medium configured to store a sliding window comprising a fixed number of data elements and a toplist;
a data element counter comprising instructions executable by the one or more processors, the instructions to cause the one or more processors to:
receive a new data element of a data stream from a data source,
in response to a determination that an identifier for the new data element matches an identifier for a data element in the toplist, updating a counter for the data element in the toplist, and
in response to a determination that the identifier for the new data element does not match any identifier for data elements in the toplist,
determine if a counter for the new data element is larger than a counter for a current smallest data element for the toplist, wherein the current smallest data element for the toplist is maintained in a data structure that is separate from the toplist,
remove from the toplist the identifier for the current smallest data element in response to a determination that the counter for the new data element is larger than the counter for the current smallest data element, and
add an identifier of the new data element and the counter for the new data element to the toplist.

2. The system of claim 1, wherein the data element counter further includes instructions to cause the one or more processors to:
in response to a determination that the identifier for the new data element matches the identifier for the data element in the toplist and that the identifier for the new data element matches the identifier for the current smallest data element:
scan the toplist to determine a data element having the smallest counter value for data elements in the toplist; and
reset the counter value for the current smallest data element counter to the counter value of the data element having the smallest counter value for data elements in the toplist, and
reset the identifier for the current smallest data element to the identifier of the data element having the smallest counter value for data elements in the toplist.

3. The system of claim 1, wherein the size of the toplist is smaller than the size of the sliding window.

4. The system of claim 1, wherein the size of the toplist is at least an order of magnitude smaller than the size of the sliding window.

5. The system of claim 1, wherein the sliding window comprises a first hashmap and the toplist comprises a second hashmap.

6. The system of claim 1, wherein the data element counter further includes instructions to cause the one or more processors to, further in response to the determination that the identifier for the new data element does not match any identifier for the data elements in the toplist:
in response to a determination that the current minimum data element is nil:
scan the toplist to determine a data element having the smallest counter value for data elements in the toplist; and
reset the counter value for the current smallest data element counter to the counter value of the data element having the smallest counter value for data elements in the toplist, and reset the identifier for the current smallest data element to the identifier of the data element having the smallest counter value for data elements in the toplist.

7. The system of claim 6, wherein the determination that the current minimum data element is nil comprises a determination that a counter for the current minimum data element has a zero value.

8. The system of claim 1, wherein the data element counter further includes instructions to cause the one or more processors to:
in response to a determination that the sliding window is full, remove a data element from the sliding window;
wherein a data element having the identifier of the data element removed from the sliding window is not removed from the toplist.

9. The system of claim 1, wherein the data stream comprises a continuous data stream.

10. A method for maintaining a toplist for a sliding window comprising a fixed number of data elements, the method comprising:
receiving a new data element from a data stream;
in response to determining that an identifier for the new data element matches an identifier for a data element in the toplist, updating a counter for the data element in the toplist; and
in response to determining that the identifier for the new data element does not match any identifier for data elements in the toplist,
determining if a counter for the new data element is larger than a counter for a current smallest data element for the toplist, wherein the current smallest data element for the toplist is maintained in a data structure that is separate from the toplist,
removing from the toplist the identifier for the current smallest data element in response to determining that the counter for the new data element is larger than the counter for the current smallest data element, and
adding an identifier of the new data element and the counter for the new data element to the toplist.

11. The method of claim 10, wherein further in response to determining that the identifier for the new data element matches the identifier for the data element in the toplist:
in response to determining that the identifier for the new data element matches the identifier for the current smallest data element:
scanning the toplist to determine a data element having the smallest counter value for data elements in the toplist; and
resetting the counter value for the current smallest data element counter to the counter value of the data element having the smallest counter value for data elements in the toplist, and resetting the identifier for the current smallest data element to the identifier of the data element having the smallest counter value for data elements in the toplist.

12. The method of claim 10, wherein the size of the toplist is at least an order of magnitude smaller than the size of the sliding window.

13. The method of claim 10, wherein the sliding window comprises a first hashmap and the toplist comprises a second hashmap.

14. The method of claim 10, wherein further in response to determining that the identifier for the new data element does not match any identifier for the data elements in the toplist:
  in response to determining that the current minimum data element is set to nil:
    scanning the toplist to determine a data element having the smallest counter value for data elements in the toplist; and
    resetting the counter value for the current smallest data element counter to the counter value of the data element having the smallest counter value for data elements in the toplist, and resetting the identifier for the current smallest data element to the identifier of the data element having the smallest counter value for data elements in the toplist.

15. The method of claim 10, further comprising:
in response to determining that the sliding window is full, removing a data element from the sliding window;
wherein a data element of the toplist having the identifier of the data element removed from the sliding window is not removed from the toplist.

16. The method of claim 10, wherein the counter has an associated time value corresponding to a last update time, and wherein the method further comprises adjusting the counter downward based on the last update time.

17. A machine-readable medium having stored thereon machine-executable instructions to cause one or more processors to:
  receive a new data element from a data stream;
  store to a non-transitory machine-readable medium a sliding window comprising a fixed number of data elements and a toplist;
  in response to a determination that an identifier for the new data element matches an identifier for a data element in the toplist, update a counter for the data element in the toplist; and
  in response to a determination that the identifier for the new data element does not match any identifier for data elements in the toplist,
    determine if a counter for the new data element is larger than a counter for a current smallest data element for the toplist, wherein the current smallest data element for the toplist is maintained in a data structure that is separate from the toplist,
    remove from the toplist the identifier for the current smallest data element in response to a determination that the counter for the new data element is larger than the counter for the current smallest data element, and
    add an identifier of the new data element and the counter for the new data element to the toplist.

18. The machine-readable medium of claim 17, wherein the machine-executable instructions include instructions to cause the one or more processors to, further in response to the determination that the identifier for the new data element matches the identifier for the data element in the toplist:
  in response to a determination that the identifier for the new data element matches the identifier for the current smallest data element:
    scan the toplist to determine a data element having the smallest counter value for data elements in the toplist; and
    reset the counter value for the current smallest data element counter to the counter value of the data element having the smallest counter value for data elements in the toplist, and reset the identifier for the current smallest data element to the identifier of the data element having the smallest counter value for data elements in the toplist.

19. The machine-readable medium of claim 17, wherein the machine executable instructions further include instructions to cause the one or more processors to, further in response to determining that the identifier for the new data element does not match any identifier for the data elements in the toplist:
  in response to a determination that the current minimum data element is set to nil:
    scan the toplist to determine a data element having the smallest counter value for data elements in the toplist; and
    reset the counter value for the current smallest data element counter to the counter value of the data element having the smallest counter value for data elements in the toplist, and reset the identifier for the current smallest data element to the identifier of the data element having the smallest counter value for data elements in the toplist.

20. The machine-readable medium of claim 17, wherein the machine-executable instructions further comprise instructions to cause the one or more processors to:
  in response to a determination that the sliding window is full, remove a data element from the sliding window;
  wherein a data element of the toplist having the identifier of the data element removed from the sliding window is not removed from the toplist.

\* \* \* \* \*